United States Patent [19]
Saito et al.

[11] Patent Number: 6,009,988
[45] Date of Patent: Jan. 4, 2000

[54] LOCK-UP CONTROL DEVICE

[75] Inventors: Yoshiharu Saito; Takanori Kon; Masamitsu Fukuchi, all of Wako, Japan

[73] Assignee: Honda Giken Kogyo Kabushiki Kaisha, Tokyo, Japan

[21] Appl. No.: 09/153,302

[22] Filed: Sep. 15, 1998

[30] Foreign Application Priority Data

Sep. 17, 1997 [JP] Japan .................................... 9-252533

[51] Int. Cl.⁷ ............................ F16D 33/00; F16H 61/58
[52] U.S. Cl. ........................ 192/3.29; 192/3.3; 192/3.31; 477/62
[58] Field of Search ..................................... 192/3.29, 3.3, 192/3.31; 477/169, 61, 62; 701/68, 69

[56] References Cited

U.S. PATENT DOCUMENTS

| | | | |
|---|---|---|---|
| 5,527,238 | 6/1996 | Hrovat et al. ............................. | 419/163 |
| 5,662,552 | 9/1997 | Fukasawa et al. ....................... | 477/169 |

FOREIGN PATENT DOCUMENTS

| | | |
|---|---|---|
| 195 20 579 A1 | 12/1995 | Germany . |
| 7-332479 | 12/1995 | Japan . |

*Primary Examiner*—Charles A. Marmor
*Assistant Examiner*—Tisha D. Waddell
*Attorney, Agent, or Firm*—Armstrong, Westerman, Hattori, McLeland & Naughton

[57] ABSTRACT

A lock-up control device is provided to control engaging force of a lock-up clutch, which shares engine output with a torque converter to transmit it toward an input shaft of a transmission. Herein, input shaft torque is estimated based on engine speed and engine intake negative pressure, while engine torque is estimated based on engine speed and throttle opening. A weight coefficient is produced based on an amount of variations of the engine torque when the amount of variations is greater than a prescribed value. Then, weighted mean engine torque is calculated by the input shaft torque and engine torque in accordance with the weight coefficient. Thus, the lock-up control device controls the lock-up clutch based on the weighted mean engine torque in such a way that the engaging force of the lock-up clutch is increased in response to the rise timing of the weighted mean engine torque. For example, the weight coefficient is determined in such a way that the engine torque is given high distributed weight in the weighted mean engine torque as compared with the input shaft torque. Thus, it is possible to increase the engaging force of the lock-up clutch promptly in response to the rise mode of the real engine torque, by which it is possible to avoid occurrence of control delay in control of the lock-up clutch.

1 Claim, 4 Drawing Sheets

LOCK-UP CONTROL DEVICE

BACKGROUND OF THE INVENTION

1. Field of the Invention

This invention relates to lock-up control devices that control engaging forces of lock-up clutches, which share engine outputs with torque converters to transmit them toward input shafts of automatic transmissions of cars. This application is based on Patent Application No. Hei 9-252533 filed in Japan, the content of which is incorporated herein by reference.

2. Description of the Related Art

The paper of Japanese Patent Application, Publication No. Hei 7-332479 discloses an example of the lock-up control device that controls engaging force of the lock-up clutch, which shares engine output with the torque converter to transmit it toward the input shaft of the automatic transmission of the car, wherein the engine output is controlled in response to throttle opening. This type of the lock-up control device has an input shaft torque estimation unit, which estimates input shaft torque of the transmission, in other words, turbine torque of the torque converter. So, the device controls the engaging force of the lock-up clutch based on the input shaft torque estimated by the input shaft torque estimation unit.

The above lock-up control device has an advantage in that the aforementioned input shaft torque can be calculated with a high precision. However, in the case where real engine torque sharply and suddenly increases, there is a disadvantage in that the rise timing of the input shaft torque should be delayed from the rise timing of the real engine torque. For this reason, the aforementioned lock-up control device that controls the engaging force of the lock-up clutch on the basis of the input shaft torque suffers from a problem that a delay occurs in control of the lock-up clutch in the case where the real engine torque sharply and suddenly increases. In consideration of the dynamics of the lock-up clutch itself, such a control delay will be increased further more.

Further, there occurs a so-called "chip-in phenomenon", according to which the engine speed decreases because the engaging force of the lock-up clutch increases after the engine speed increases unnecessarily high. In other words, in the chip-in phenomenon, the engine speed increases unnecessarily high, then, the engine speed decreases. This chip-in phenomenon is disadvantageous for the car (and driver) in aspects of drivability and fuel efficiency.

SUMMARY OF THE INVENTION

It is an object of the invention to provide a lock-up control device that is capable of avoiding occurrence of control delay of the lock-up clutch so as to provide avoidance in occurrence of the chip-in phenomenon as well as improvements in drivability and fuel efficiency.

A lock-up control device is provided to control engaging force of a lock-up clutch, which shares engine output with a torque converter to transmit it toward an input shaft of a transmission.

According to the lock-up control device of this invention, input shaft torque is estimated based on engine speed and engine intake negative pressure, while engine torque is estimated based on engine speed and throttle opening. A weight coefficient is produced based on an amount of variations of the engine torque when the amount of variations is greater than a prescribed value. Then, weighted mean engine torque is calculated by the input shaft torque and engine torque in accordance with the weight coefficient. Thus, the lock-up clutch is controlled based on the weighted mean engine torque in such a way that the engaging force of the lock-up clutch is increased in response to the rise timing of the weighted mean engine torque.

In the case where the real engine torque is increased sharply and suddenly, the weight coefficient is determined in such a way that the engine torque is given high distributed weight in the weighted mean engine torque as compared with the input shaft torque. Thus, it is possible to increase the engaging force of the lock-up clutch promptly in response to the rise mode of the real engine torque, by which it is possible to avoid occurrence of control delay in control of the lock-up clutch.

In the case where the real engine torque is not increased sharply nor suddenly, the input shaft torque is given high distributed weight in the weighted mean engine torque as compared with the engine torque. Thus, it is possible to control the engaging force of the lock-up clutch substantially in response to the input shaft torque which is estimated with a high precision.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of example with reference to the accompanying drawings.

Figure 1:
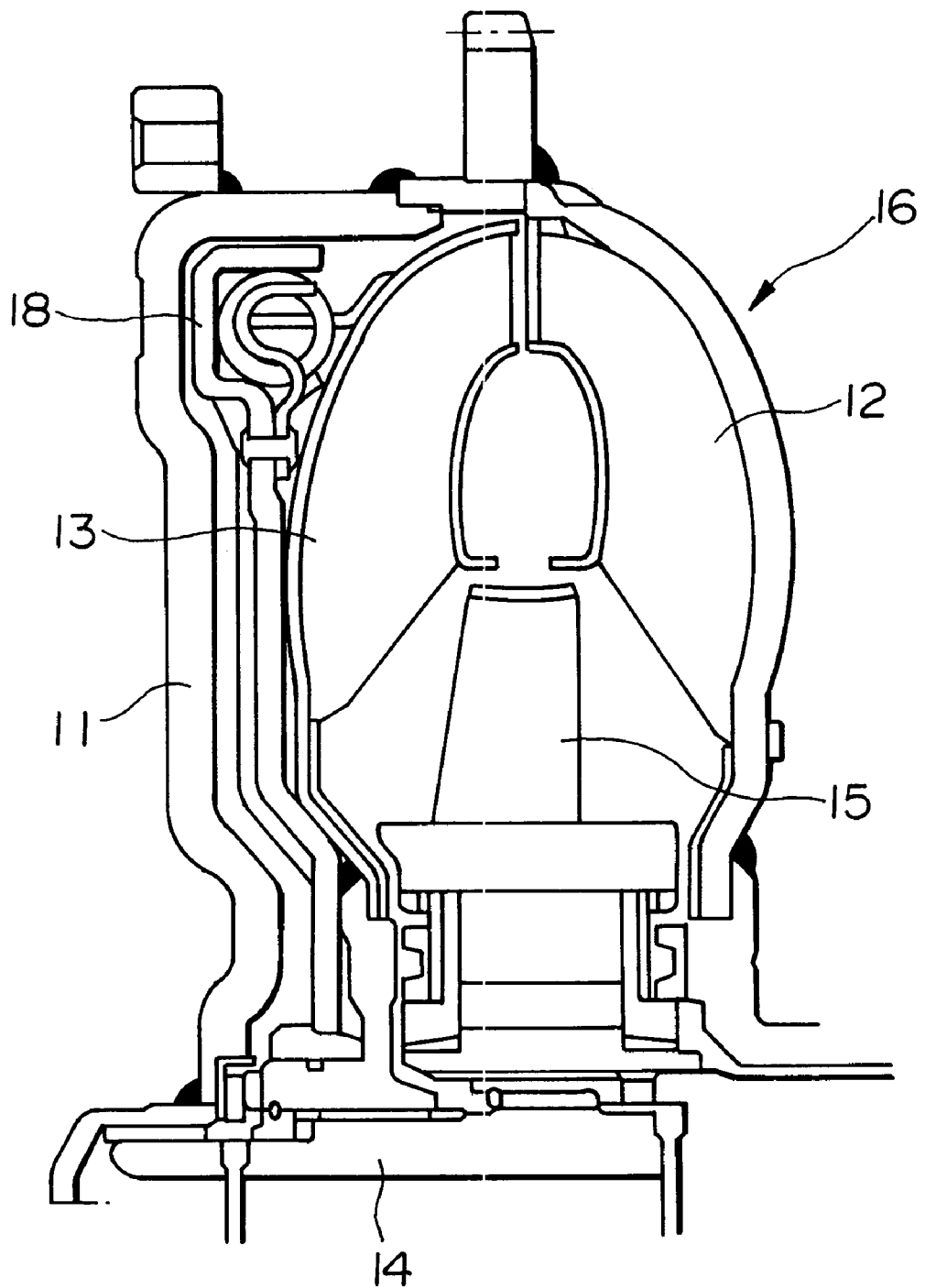
FIG. 1 is a sectional view showing an example of mechanical construction with regard to the lock-up clutch and torque converter.

FIG. 1 shows an example of mechanical construction with regard to the lock-up clutch, torque converter and transmission of the car. In FIG. 1, a cover 11 is connected to a crank shaft, which corresponds to an output shaft of an engine (not shown). A pump impeller 12 is fixed to the cover 11 and is rotated together with the cover 11 by driving force of the engine. A turbine runner 13 is arranged at an opposite side of the pump impeller 12. An input shaft 14 of a transmission (not shown) is fixed to the turbine runner 13. A stator 15 is arranged at interior portions of the pump impeller 12 and the turbine runner 13. Incidentally, the pump impeller 12, turbine runner 13 and stator 15 are assembled together to construct a torque converter 16.

A lock-up clutch 18 shares engine output with the torque converter 16 to transmit it toward the input shaft 14 of the transmission. The lock-up clutch 18 is arranged between the cover 11 and turbine runner 13 and is also fixed to the input shaft 14 of the transmission. In response to hydraulic pressure difference detected between the cover 11 and the turbine runner 13, the lock-up clutch 18 comes in contact with or leaves from the cover 11.

In a fixed state that the lock-up clutch 18 is fixedly placed in contact with the cover 11, it is possible to directly transmit driving force, given from the engine, toward the input shaft 14 of the transmission without intervening the torque converter 16. In a separated state that the lock-up clutch 18 is completely separated from the cover 11, the driving force given from the engine is fully transmitted to the pump impeller 12, so that the pump impeller 12 is rotated. Then, fluid movement caused by rotation of the pump impeller 12 induces rotation of the turbine runner 13, so that the driving force is transmitted to the input shaft 14 of the transmission (by means of the torque converter 16).

By controlling the aforementioned hydraulic pressure difference, it is possible to control a contact state of the lock-up clutch 18 against the cover 11, in other word, engaging force of the lock-up clutch 18. So, by controlling the engaging force of the lock-up clutch 18, it is possible to control distribution between a first amount of transmitted force that the driving force of the engine is directly transmitted to the input shaft 14 via the lock-up clutch 18 and a second amount of transmitted force that the driving force is transmitted to the input shaft 14 via the torque converter 16.

Figure 2:
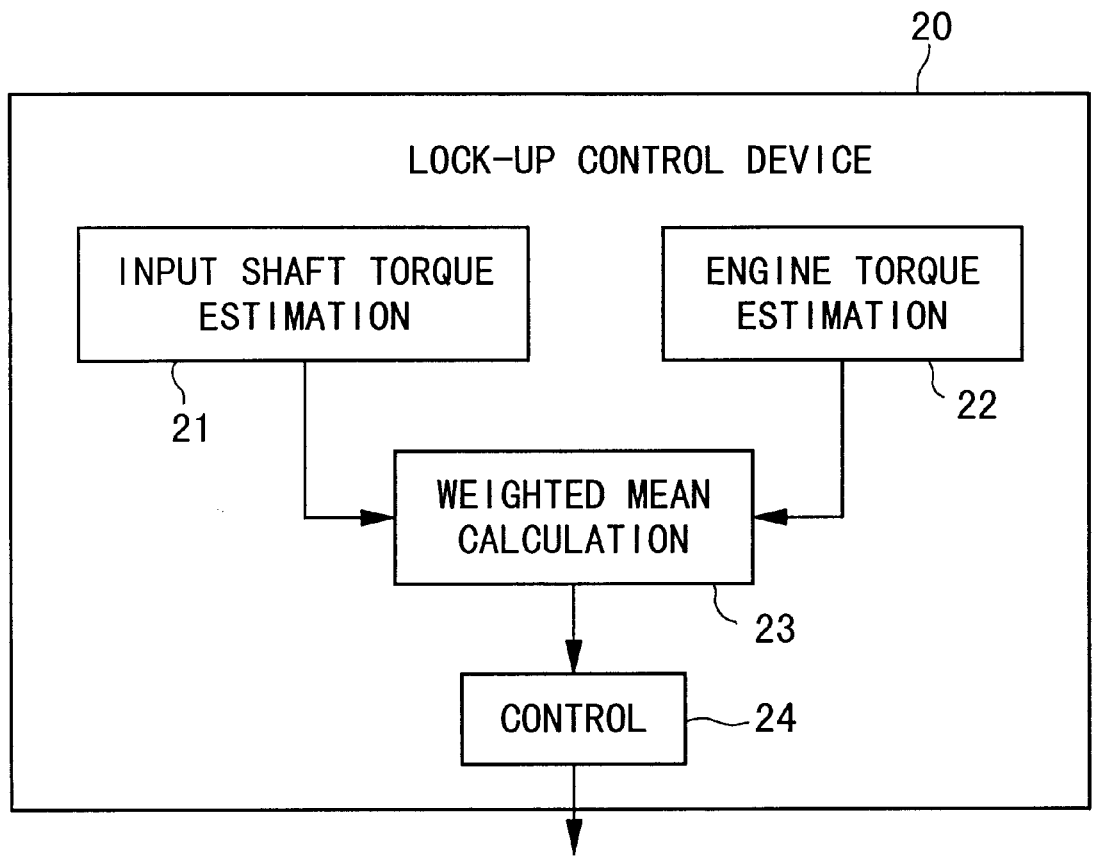
FIG. 2 is a block diagram showing a configuration of a lock-up control device in accordance with preferred embodiment of the invention.

FIG. 2 shows a configuration of a lock-up control device 20 in accordance with the preferred embodiment of the invention. The lock-up control device 20 of FIG. 2 controls the aforementioned hydraulic pressure difference so as to control engaging force of the lock-up clutch 18 against the cover 11. In FIG. 2, the lock-up control device 20 is configured by an input shaft torque estimation unit 21, an engine torque estimation unit 22, a weighted mean calculation unit 23 and a control unit 24.

The input shaft torque estimation unit 21 produces torque TT of the input shaft 14 of the transmission as an estimated value. Based on real load that is defined by prescribed elements such as engine speed NE and engine intake negative pressure Pb, the input shaft torque estimation unit 21 produces the input shaft torque TT in accordance with a map whose content is set in advance. Other than the aforementioned elements defining the real load, it is possible to employ a slip state of the torque converter 16, in other words, a relationship between revolutions of the engine and revolutions of the input shaft 14.

Based on predicted load that is defined by the engine speed Ne as well as throttle opening TH for controlling engine output, the engine torque estimation unit 22 produces engine torque TETH as an estimated value in accordance with a map whose content is set in advance.

The engine is controlled by a throttle valve control device (not shown), which electrically controls real throttle opening in such a way that the throttle opening TH is obtained. Herein, the throttle opening TH is produced in accordance with a preset map on the basis of various kinds of car travel conditions as well as accel pedal opening which is detected. Then, the throttle opening TH produced by the throttle valve control device is input to the engine torque estimation unit 22.

The weighted mean calculation unit 23 calculations an amount of variations "DTETH" of the engine torque, which is produced by the engine torque estimation unit 22. If the amount of variations DTETH is greater than a prescribed value DTETH1, the weighted mean calculation unit 22 produces a weight coefficient RLC based on DTETH. This weight coefficient RLC is retrieved from a table whose content indicates a characteristic curve shown in FIG. 3.

Figure 3:
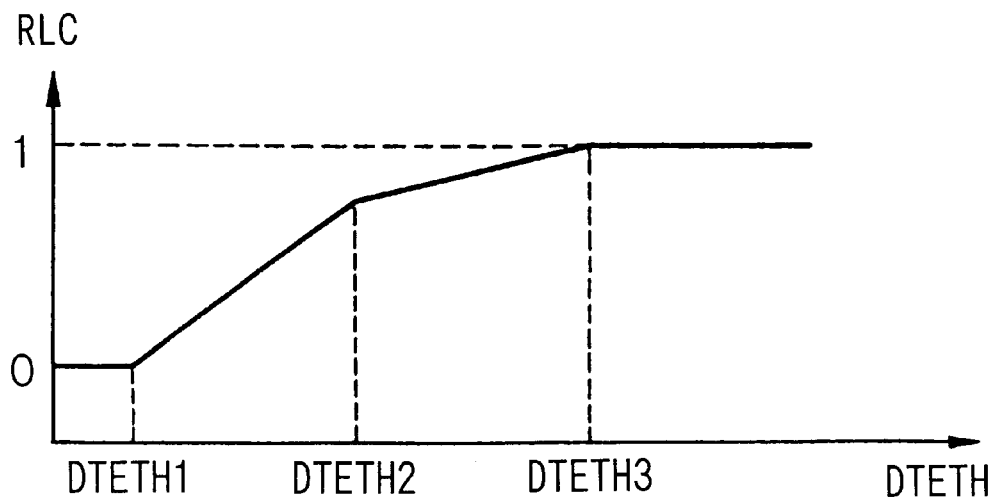
FIG. 3 is a graph showing a relationship between weight coefficients and amounts of variations of engine torque.

As shown in FIG. 3, the weight coefficient RLC read from the table is changed in four stages, which are respectively defined using prescribed values DTETH1, DTETH2 and DTETH3. At a first stage where the amount of variations DTETH belongs to a range up to the prescribed value DTETH1, the weight coefficient RCL is set at zero. At a second stage where the amount of variations DTETH belongs to a range between the prescribed values DTETH1 and DTETH2 (i.e., DTETH1<DTETH<DTETH2), the weight coefficient RLC increases from zero in proportional to an increase of the amount of variations DTETH. At a third stage where the amount of variations DTETH belongs to a range between the prescribed values DTETH2 and DTETH3 (i.e., DTETH2<DTETH<DTETH3), the weight coefficient RCL increases up to "1" in proportional to an increase of the amount of variations DTETH. Incidentally, a proportional constant used in the range between DTETH2 and DTETH3 is smaller than a proportional constant used in the aforementioned range between DTETH1 and DTETH2. At a fourth stage where the amount of variations DTETH is greater than the prescribed value DTETH3, the weight coefficient RCL is set at "1".

Using the weight coefficient RCL, the weighted mean calculation unit 23 calculates a weighted mean value of torque (or weighted mean engine torque) TTLC based on the input shaft torque TT produced by the input shaft torque estimation unit 21 and the engine torque TETH produced by the engine torque estimation unit 22 in accordance with a formula as follows:

$$TTLC = TETH*RLC + TT*(1-RLC)$$

This formula and the aforementioned table show that as the amount of variations DTETH becomes large, the weight coefficient RLC becomes large correspondingly. Thus, within the weighted mean value of torque TTLC, the engine torque TETH is given high (distributed) weight as compared with the input shaft torque TT.

The control unit 24 controls engaging force of the lock-up clutch 18 based on the weighted mean value of torque TTLC calculated by the weighted mean calculation unit 23. Thus, the control unit 24 controls the lock-up clutch 18 in such a way that the engaging force is increased in response to the rise timing of the weighted mean value of torque TTLC.

Figure 4:
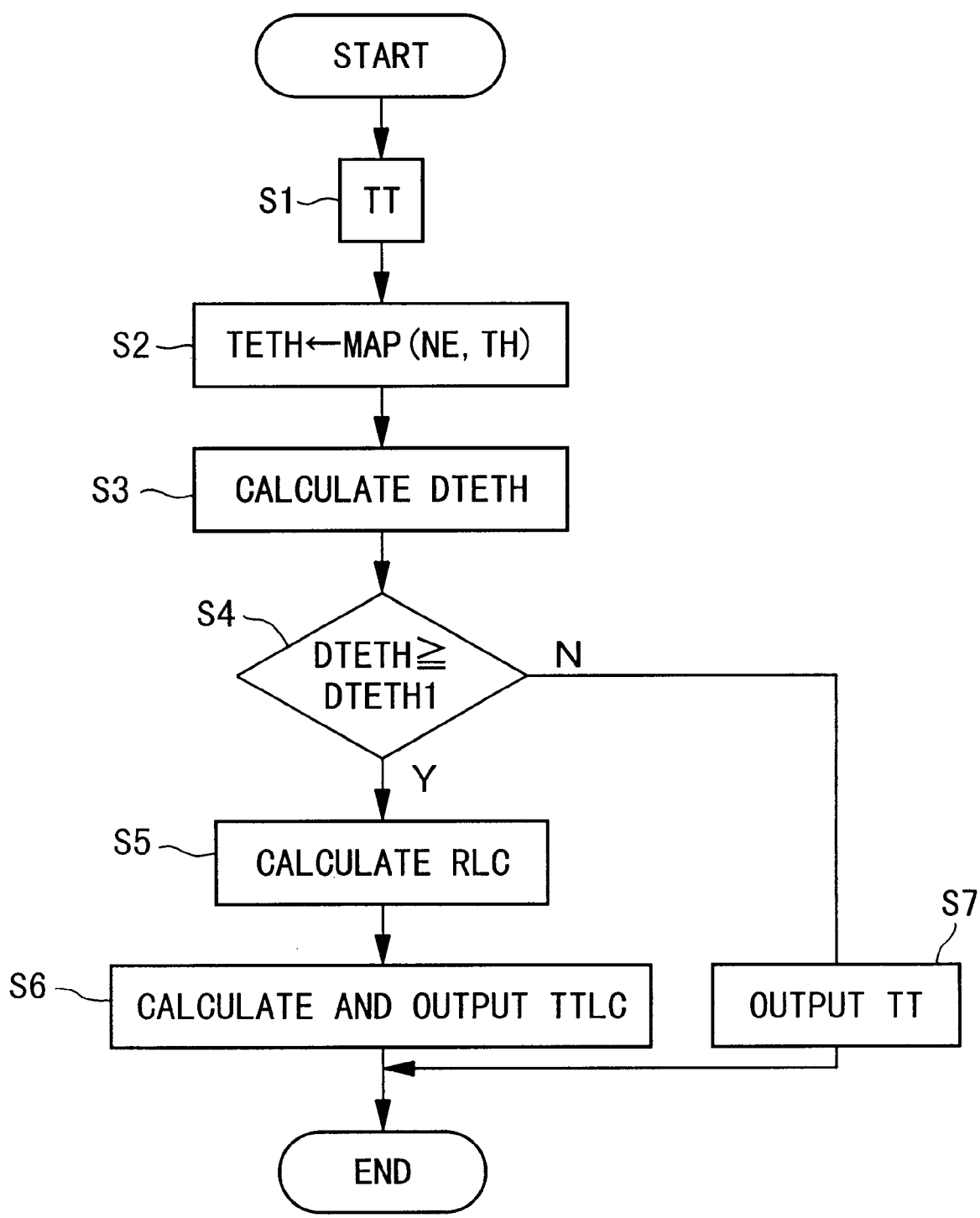
FIG. 4 is a flowchart showing operations of the lock-up control device of FIG. 2.

Now, operation of the lock-up control device 20 will be described with reference to a flowchart shown in FIG. 4. In step S1, the input shaft torque estimation unit 21 performs estimation based on the read load defined by the engine speed Ne and engine intake negative pressure Pb to produce input shaft torque TT in accordance with the preset map. In step S2, the engine torque estimation unit 22 performs estimation based on the predicted load defined by the engine speed Ne and throttle opening TH to produce engine torque TETH in accordance with the preset map In step S3, the weighted mean calculation unit 23 calculates an amount of variations DTETH based on the engine torque TETH produced by the engine torque estimation unit 22. In step S4, a decision is made as to whether the amount of variations DTETH is greater than the prescribed value DTETH1 or not. If the amount of variations DTETH is greater than the prescribed value DTETH1, the lock-up control device 20 transfers control to step S5, wherein a weight coefficient RLC is produced based on DTETH with reference to the aforementioned table whose content is shown in FIG. 3. In step S6, the weighted mean calculation unit 23 performs weighted mean calculation using the weight coefficient RLC to produce a weighted mean value TTLC for the input shaft torque TT and the engine torque TETH. If the lock-up control device 20 makes a decision in step S4 that the amount of variations DTETH is less than the prescribed value DTETH1, it outputs the input shaft torque TT, which is produced in the foregoing step S1, in step S7.

As described above, the weighted mean calculation unit 23 outputs either the weighted mean value TTLC or the input shaft torque TT. Thus, the control unit 24 controls engaging force of the lock-up clutch 18 based on one of the weighted mean value TTLC and input shaft torque TT, which is output from the weighted mean calculation unit 23.

Figure 5:
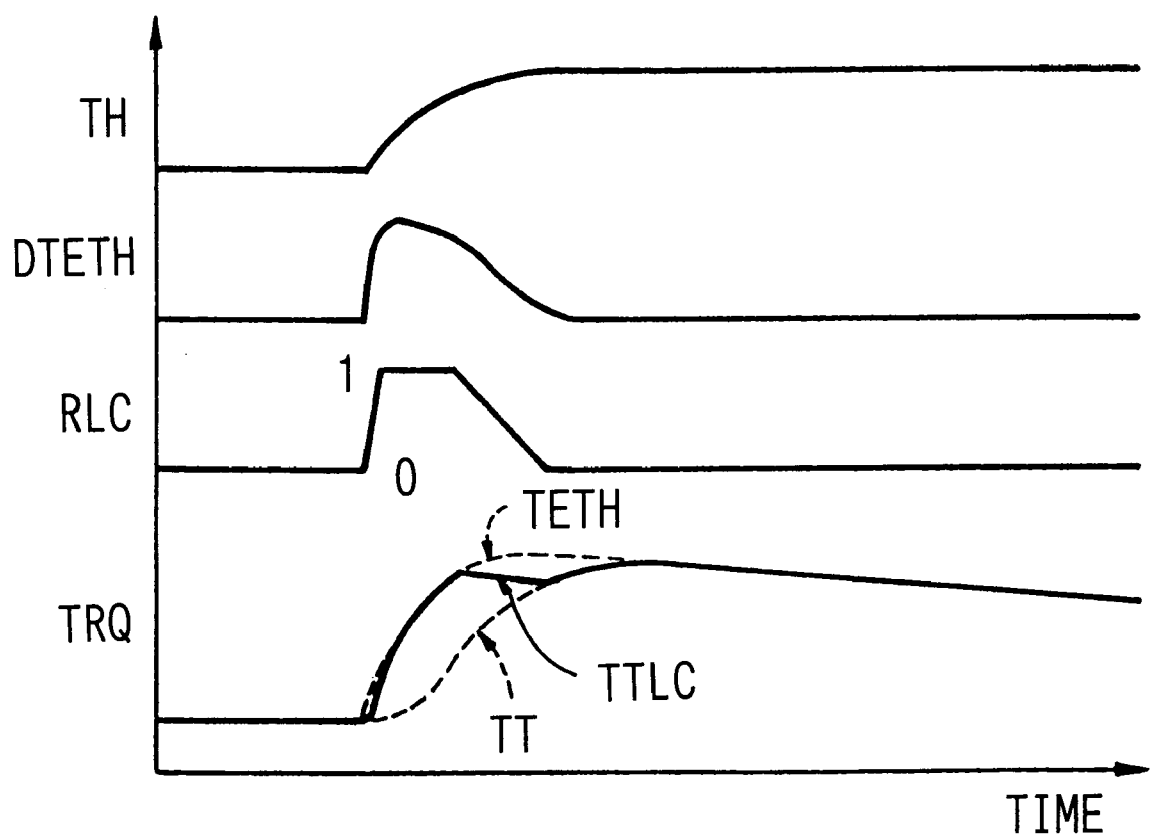
FIG. 5 is a graph showing relationships between engine torque and selected factors contributing to control of the engine torque in accordance with the lock-up control device of FIG. 2.

FIG. 5 shows an example of relationships between the throttle opening TH, amount of variations DTETH, weight coefficient RLC and torque TRQ, which are varied in a lapse of time in response to the control of the lock-up control device 20. FIG. 5 shows the example that the throttle opening TH increases (or rises) sharply. In response to such a sharp increase of the throttle opening TH, the amount of variations DTETH is increased, while the weight coefficient RLC is increased to "1". In addition, the torque TRQ is varied in such a way that the weighted mean value TTLC coincides with the engine torque TETH. At an end period of the rise time of the throttle opening TH, the amount of variations DTETH is decreased, while the weight coefficient RLC is decreased as well. In addition, the torque TRQ is varied in such a way that the weighted mean value TTLC gradually coincides with the input shaft torque TT as compared with the engine torque TETH, in other words, the input shaft torque TT is given (relatively) high distributed weight as compared with the engine torque TETH with respect to the weighted mean value TTLC. After completion of the rise time of the throttle opening TH, the torque TRQ will completely coincide with the input shaft torque TT.

Due to the aforementioned control, under a sudden change state where the real engine torque rises sharply and suddenly, the engine torque estimation unit 22 produces the amount of variations DTETH for the engine torque, which becomes large. So, by detecting an event that DTETH becomes large, distributed weight of the engine torque TETH, which is produced by the weighted mean calculation unit 23 based on the engine speed Ne and throttle opening TH, is made large in the weighted mean value TTLC. Information of the engine speed Ne and throttle opening TH can be obtained at a very early stage in the change event of the real engine torque. So, the engine torque TETH which is produced based on the above information rises earlier than the input shaft torque TT which is produced by the input shaft torque estimation unit 21. The lock-up control device 20 controls the engaging force of the lock-up clutch 18 based on the weighted mean value TTLC in which the engine torque TETH is given high distributed weight. So, it is possible to increase the engaging force of the lock-up clutch 18 promptly in response to the rise mode of the real engine torque. Thus, it is possible to avoid occurrence of control delay in controlling of the lock-up clutch 18.

By the way, there exists a minimum value in amounts of variations of the engine torque, according to which change of the weighted mean value TTLC is considered effective to cope with the control delay of the lock-up clutch 18. So, such a minimum value is set as the aforementioned prescribed value DTETH1.

As described before, the chip-in phenomenon occurs when the engine speed increases unnecessarily high so that the engaging force increases, then, the engine speed decreases. However, the lock-up control device of the present embodiment is capable of avoiding occurrence of the chip-in phenomenon, so that it is possible to improve the drivability as well as the fuel efficiency.

Under a non-sudden change state where the real engine torque does not increase sharply nor suddenly, the present embodiment is capable of controlling the engaging force of the lock-up clutch 18 in response to the input shaft torque TT whose precision is relatively high or in response to the weighted mean value TTLC in which the input shaft torque TT is given high distributed weight.

As described heretofore, the weighted mean value TTLC is configured using the input shaft torque TT produced by the input shaft torque estimation unit 21 and the engine torque TETH produced by the engine torque estimation unit 22, which are given distributed weights respectively. By adequately changing the distributed weights of the input shaft torque TT and engine torque TETH in the weighted mean value TTLC based on the amount of variations DTETH of the real engine torque, the present embodiment is capable of controlling the lock-up clutch 18 without damaging high precision and without being influenced by the control delay.

As described heretofore, the present embodiment is designed as follows:

When the amount of variations DTETH of the engine torque which is produced by the engine torque estimation unit 22 is greater than the prescribed value DTETH1, the weighted mean value TTLC configured by the input shaft torque TT and engine torque TETH is calculated based on the weight coefficient RLC which is produced based on the amount of variations DTETH.

Within the scope of the invention, the present embodiment can be modified as follows:

If an amount of variations DTH of the throttle opening TH is greater than a prescribed value, the weighted mean value TTLC configured by the input shaft torque TT and engine torque TETH is calculated based on the weight coefficient RLC which is produced based on the amount of variations DTH.

In the above modification, it is necessary to provide a table whose content defines a relationship between the amount of variations DTH and the weight coefficient RLC.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A lock-up control device for controlling engaging force in a lock-up clutch so as to change an amount of torque transmitted to the lock-up clutch, said lock-up control device comprising:

input shaft torque estimation means for producing input shaft torque applied to an input shaft of a transmission;

engine torque estimation means for producing engine torque based on engine speed and throttle opening;

weighted mean engine torque calculation means for if an amount of variations in the engine torque or the throttle opening is greater than a predetermined value, producing weighted mean engine torque by the input shaft torque and the engine torque in accordance with a weight coefficient, which is calculated based on the amount of variations; and control means for controlling the engaging force in the lock-up clutch based on the weighted mean engine torque.

* * * * *